United States Patent [19]

Beckerle et al.

[11] Patent Number: 5,512,629
[45] Date of Patent: Apr. 30, 1996

[54] AQUEOUS POLYMER DISPERSIONS

[75] Inventors: Wilhelm F. Beckerle, Bobenheim-Roxheim; Rolf Petri, Frankenthal; Bernhard Dotzauer, Maxdorf; Manfred Schwartz, Ludwigshafen; Maximilian Angel, Schifferstadt, all of Germany

[73] Assignee: BASF Aktiengesellschaft, Ludwigshafen, Germany

[21] Appl. No.: 246,828

[22] Filed: May 20, 1994

[30] Foreign Application Priority Data

May 21, 1993 [DE] Germany ............... 43 17 035.8

[51] Int. Cl.$^6$ .................................................. C08L 35/06
[52] U.S. Cl. ................... 524/819; 514/820; 514/827; 514/828; 514/556; 514/558
[58] Field of Search ................... 524/827, 819, 524/558, 560, 820, 828

[56] References Cited

U.S. PATENT DOCUMENTS

| | | |
|---|---|---|
| 3,232,899 | 2/1966 | Guziak. |
| 4,225,496 | 9/1980 | Columbes et al.. |
| 4,558,092 | 12/1988 | Reinscke et al. ............ 524/547 |
| 4,816,558 | 3/1989 | Rauch et al. ............ 524/832 |
| 5,145,625 | 9/1992 | Dotzauer et al. ............ 264/109 |

FOREIGN PATENT DOCUMENTS

| | | |
|---|---|---|
| 0043911 | 1/1982 | European Pat. Off.. |
| 0262326 | 4/1988 | European Pat. Off.. |
| 0332067 | 9/1989 | European Pat. Off.. |
| 537411 | 4/1993 | European Pat. Off.. |
| 0537411 | 4/1993 | European Pat. Off.. |
| 845499 | 12/1976 | France. |
| 2377426 | 8/1978 | France. |
| 1569903 | 11/1965 | Germany. |
| 2837898 | 3/1979 | Germany. |
| 3220384 | 12/1983 | Germany. |
| 3907013 | 9/1990 | Germany. |
| 54-43285 | 4/1979 | Japan. |
| 3-131553 | 6/1991 | Japan. |

OTHER PUBLICATIONS

American Chemical Society Symposium Series, vol. 165, S. Nishida, et al., "Preparation and Characterization of Alkali-Swellable Carboxylated Latexes", pp. 291–314, 1981.

Makromol. Chem. Appl. 10/11, M. S. El-Aasser, et al., "Swelling of Carboxyl-Containing Copolymer Latexes", pp. 335–357, 1985.

Journal of Applied Polymer Science, vol 44, C. J. Verbrugge, "Mechanism of Alkali Thickening of Acid Containing Emulsion Polymer. I. Examination Of Latexes By Means of Viscosity", pp 897–909, 1970.

Primary Examiner—Jeffrey T. Smith
Attorney, Agent, or Firm—Oblon, Spivak, McClelland, Maier & Neustadt

[57] ABSTRACT

Aqueous dispersions of polymers which have a high glass transition temperature and a low average molecular weight and contain a specific amount of methacrylic acid as polymerized units are suitable, in liquid or dried form, as additives for improving the flow behavior of cement-containing mineral building materials having binding properties.

16 Claims, No Drawings

AQUEOUS POLYMER DISPERSIONS

The present invention relates to aqueous polymer dispersions which are obtainable by polymerizing a monomer mixture composed of

- from 70 to 85% by weight of at least one monomer selected from the group consisting of styrene, vinyltoluenes, nitriles of α,β -monoethylenically unsaturated carboxylic acids of 3 to 6 carbon atoms and esters of α,β-monoethylenically unsaturated carcarboxylic acids of 3 to 6 carbon atoms and alkanols of 1 to 12 carbon atoms (monomers a),
- from 15 to 25% by weight of at least one α,β-monoethylenically unsaturated carboxylic acid of 3 to 6 carbon atoms and/or amides thereof (monomers b) and
- from 0 to 5% by weight of other copolymerizable monomers (monomers c)

by the aqueous free radical emulsion polymerization method, with the proviso that the monomers b comprise at least 50% by weight, based on their total amount, of methacrylic acid, the composition of the total monomers a, b and c used is chosen so that a glass transition temperature of from 80° to 160° C. results according to the Fox relationship for an emulsion polymer composed of these monomers and the K value of the resulting emulsion polymer, determined in its fully acidic form in dimethylformamide at 23° C. and an emulsion polymer content of 0.1% by weight, is from 15 to 40.

The present invention furthermore relates to processes for the preparation of these aqueous polymer dispersions and to their use, in aqueous or dry form, as additives for cement-containing mineral building materials having binding properties.

Mineral building materials having binding properties include preparations which contain, as essential components, mineral binders, such as cement, lime or gypsum, and sands, gravels or crushed rocks serving as additives, or other fillers, for example including natural or synthetic fibers, and which, after mixing with water, solidify and harden (become compacted) in the air and in some cases also under water.

In many cases, it is now desirable for the mineral building material having binding properties, when mixed in the ready-to-use form, on the one hand to have advantageous flow behavior, ie. a very low flow limit (the flow limit is defined as the shear stress above which a material behaves like a liquid, ie. flows, whereas it behaves like a solid, ie. does not flow, under the action of shear stresses below the flow limit) and, under the action of shear stresses above the flow limit, to have very little resistance to flow and a very low dynamic viscosity, but on the other hand for its compaction to take place simultaneously without separation of the additives, so that the compacted mineral building material having binding properties has a very homogeneous structure.

Examples of such requirements are self-leveling leveling compounds based on mineral binders (they are applied to substrates having irregularities in order to obtain a smooth surface and should level like a liquid under the action of the shear stresses generated in particular by the irregularities of the substrate, so that a uniform level is automatically produced) or mortars which, for reasons of expediency, should be pumpable.

It is now generally known that the properties of mineral building materials having binding properties can be modified by adding aqueous polymer dispersions (in aqueous or dry form). As a rule, however, this is associated with an increase in the time required for said building material to reach its ready-to-use strength (in the case of leveling compounds, for example, the time which elapses until the applied leveling compound can be walked on without damage).

It is an object of the present invention to provide aqueous polymer dispersions which, when added (in aqueous or dry form) to cement-containing mineral building materials having binding properties in the freshly mixed state, result in advantageous flow behavior of said building materials without substantially influencing the compaction time taken to reach the ready-to-use strength and without the properties in the compacted state, such as mechanical strength, adhesion to substrate, surface characteristics, water resistance, etc., being substantially adversely affected.

We have found that this object is achieved by the aqueous polymer dispersions stated at the outset.

The K value is a relative viscosity number which is determined similarly to DIN 53,726. It expresses the flow velocity of pure dimethylformamide (DMF) relative to the flow velocity of DMF containing 0.1% by weight (based on the total weight) of polymer and characterizes the average molecular weight of the polymer (cf. Cellulosechemie, 13 (1932), 58–64, and Kirk-Othmer, Encyclopedia of Chemical Technology, Vol. 23, pages 967–968). A high K value corresponds to a high average molecular weight. The novel emulsion polymers in fully acidic form preferably have a K value of from 20 to 35, particularly preferably from 20 to 30.

According to Fox (T. G. Fox, *Bull. Am. Phys. Soc.* (Ser. II) 1 (1956), 123), a good approximation for the glass transition temperature of copolymers is $$\frac{1}{Tg} = \frac{X^1}{Tg^1} + \frac{X^2}{Tg^2} + \ldots \frac{X^n}{Tg^n}$$

where $X^1, X^2, \ldots, X^n$ are the mass fractions of the monomers $1, 2, \ldots, n$ and $Tg^1, Tg^2, \ldots, Tg^n$ are the glass transition temperatures of the polymers composed in each case of only one of the monomers $1, 2, \ldots$ or $n$, in degrees Kelvin.

The glass transition temperatures of these homopolymers of the monomers a, b and c are known and are stated in, for example, J. Brandrup and E. H. Immergut, *Polymer Handbook* 1st Ed., J. Wiley, New York 1966 and 2nd Ed. J. Wiley, New York 1975. In particular, the glass transition temperatures of the homopolymers of the monomers a and b are stated in Ullmann's Encyclopedia of Industrial Chemistry, Verlag Chemie, Weinheim (1992), Vol. A21, Table 8, page 169. Preferably, a glass transition temperature of from 90° to 130° C. is calculated according to Fox for the monomer mixtures to be polymerized according to the invention.

*J. Appl. Polym. Sci.* 11 (1970), 897–909 and 911–928 disclose aqueous polymer dispersions which have been obtained by free radical emulsion polymerization of monomer mixtures consisting of 80% by weight of methyl methacrylate and 20% by weight of methacrylic acid. Since there is no mention of the presence of molecular weight regulators, the K value of these emulsion polymers is inevitably above 40.

*Makrom. Chem. Suppl.* 10/11 (1985), 335–357, and ACS Symposium Series, American Chemical Society, Vol. 165, *Emulsion Polymers and Emulsion Polymerization* (1981), pages 290–313 disclose aqueous polymer dispersions which have likewise been obtained by free radical emulsion polymerization of monomer mixtures consisting of 80% by weight of methyl methacrylate and 20% by weight of methacrylic acid. Here, however, the polymerization was carried out in the presence of molecular weight regulators (n-dodecyl mercaptan), the amount of which, however, was only from 0.02 to 0.08% by weight, based on the monomers to be polymerized. The K value of these emulsion polymers is therefore likewise above 40.

German Published Application DAS 1,569,903, BE-A 8,454,499, JP-A 54/43285, U.S. Pat. No. 4,225,496, DE-A 32 20 384, DE-A 28 37 898, U.S. Pat. No. 3,232,899 and JP-A 91/131 533 recommend aqueous polymer dispersions of emulsion polymers containing polymerized $\alpha,\beta$-monoethylenically unsaturated carboxylic acids, as additives for cement-containing mineral building materials having binding properties. However, owing to the fact that their average molecular weight is too high and/or their glass transition temperature is too low and/or their proportion of $\alpha,\beta$-monoethylenically unsaturated carboxylic acids is too high or too low, these emulsion polymers cannot achieve the object of this invention in a completely satisfactory manner.

EP-A 537 411 recommends the general use of dispersions of polymers having a high Tg as additives for cement mortar. However, the property of a high glass transition temperature of dispersed polymer is not sufficient for achieving the object of this invention.

DE-A 39 07 013 relates to aqueous polymer dispersions whose emulsion polymers are composed of from 60 to 95% by weight of methyl methacrylate (monomer I), from 5 to 40% by weight of acrylic and/or methacrylic acid (monomer II) and, if required, other comonomers, with the proviso that their glass transition temperature is from 60° to 125° C. These aqueous polymer dispersions are recommended as binders for moldings. The range from $5 \cdot 10^3$ to $5 \cdot 10^6$, preferably from $2 \cdot 10^5$ to $2 \cdot 10^6$, is stated as the number average molecular weight of the emulsion polymers, and the preferred monomer composition is from 60 to 75% by weight of methyl methacrylate, from 5 to 30% by weight of methacrylic acid and from 0 to 10% by weight of acrylic acid.

EP-A 262 326 and EP-A 332 067 relate to processes for the preparation of a redispersible polymer powder by drying a polymer dispersion, containing a dispersed polymer having a dynamic freezing point $T_{\lambda max}$ of from 60 to 150° C. and composed of from 20 to 60% by weight of acrylic and/or methacrylic acid and from 40 to 80% by weight of lower alkyl esters of acrylic and/or methacrylic acid or of a mixture thereof with styrene and, if required, further comonomers, by special spray-drying methods. They recommend using the redispersed polymer powders for the preparation of coatings for drugs.

According to the invention, the monomers a used are preferably monomer mixtures which comprise at least 50, preferably at least 75%, by weight of methyl methacrylate. Among these, mixtures of styrene and methyl methacrylate are preferred. The total amount of monomers a particularly advantageously comprises exclusively methyl methacrylate.

Suitable monomers b are advantageously mixtures which contain at least 75% by weight of methacrylic acid. In general, monomer mixtures b comprising methacrylic acid and acrylic acid are preferred to other monomer mixtures b. Methacrylic acid is preferably used exclusively as monomer b.

Particularly suitable monomers c are those having a polar structure, for example acrylamidopropanesulfonic acid, vinylpyrrolidone, hydroxyethyl acrylate or quaternary vinylimidazole. Preferably, no monomers c are present as polymerized units.

The monomer mixture to be polymerized according to the invention therefore particularly advantageously has the following composition: from 75 to 85% by weight of methyl methacrylate and from 15 to 25% by weight of methacrylic acid.

The novel aqueous polymer dispersions are prepared in a conventional manner by the aqueous free radical emulsion polymerization method, ie. as a rule in the presence of dispersants and free radical polymerization initiators, the polymerization conditions being chosen, in a manner known per se to the skilled worker, so that the resulting average molecular weight, ie. the K value, is in the range according to the invention. In general, temperatures of from room temperature to 100° C., preferably from 60° to 90° C., are employed.

Suitable free radical polymerization initiators are all those which are capable of initiating an aqueous free radical emulsion polymerization in the stated temperature range. They may be both peroxides, for example alkali metal peroxydisulfates (in particular sodium peroxydisulfate), and azo compounds.

Suitable dispersants are both the protective colloids usually used for carrying out aqueous free radical emulsion polymerizations and emulsifiers. Examples of suitable protective colloids are polyvinyl alcohols, cellulose derivatives or vinylpyrrolidone-containing copolymers. Preferred novel aqueous polymer dispersions are those which have been prepared without the presence of protective colloids. Preferably, exclusively emulsifiers whose relative molecular weights, in contrast to the protective colloids, are usually less than 1,000 are used as dispersants. They are preferably anionic and/or nonionic. Conventional emulsifiers are, for example, ethoxylated mono-, di- and trialkylphenols (degree of ethoxylation: from 3 to 50, alkyl radical: $C_4$ to $C_9$), ethoxylated fatty alcohols (degree of ethoxylation: from 0 to 50, alkyl radical: $C_8$ to $C_{36}$) and alkali metal and ammonium salts of alkylsulfates (alkyl radical: $C_8$ to $C_{12}$) and of sulfuric half-esters of ethoxylated alkylphenols (degree of ethoxylation: from 3 to 50, alkyl radical: $C_4$ to $C_{15}$) and, particularly preferably, ethoxylated alkanols (degree of ethoxylation: from 0 to 30, alkyl radical: $C_{10}$ to $C_{18}$).

The desired average molecular weight is advantageously established by carrying out the polymerization in the presence of molecular weight regulators.

Particularly suitable molecular weight regulators are sulfur/hydrogen compounds, such as alkyl mercaptans, e.g. tert-dodecyl mercaptan, thioglycolic acid and esters thereof, mercaptoalkanols, such as mercaptoethanol, and allyl sulfide. The use of mercaptoethanol or esters of thioglycolic acid has proven particularly advantageous. The ester of thioglycolic acid and 2-ethylhexanol is very particularly advantageously used. The required amount of these molecular weight regulators is usually from 0.1 to 4% by weight, based on the monomers to be polymerized. As a rule, however, from 0.5 to 3 or from 1 to 2.5% by weight of molecular weight regulators are required. The amount of the required polymerization initiators is usually from 0.5 to 2% by weight, on the same basis, and the required amount of dispersant is usually from 0.5 to 3% by weight, on the same basis.

Furthermore, compounds such as Mohr's salt $((NH_4)_2Fe(SO_4)_2 \cdot 6H_2O)$ may be added in small amounts to regulate the pH when carrying out the aqueous free radical emulsion polymerization. The pH of the polymerization medium is in general from 1 to 5 during the polymerization.

The emulsion polymerization is preferably carried out by a method in which some of the dispersant (up to 10% by weight, based on the total amount thereof used) and some of the polymerization initiator (up to 20% by weight, based on the required total amount) are initially taken in the aqueous phase and heated to the polymerization temperature, after which the monomers to be polymerized are preemulsified in the aqueous phase while maintaining the polymerization temperature, and an aqueous solution of the remaining amount of polymerization initiator is added simultaneously and continuously to the polymerization vessel (as a rule in the course of a few hours). The molecular weight regulator is advantageously added as part of the aqueous monomer emulsion to be introduced (in large-scale industrial production, it proves advantageous initially to take a small portion of the monomer/regulator emulsion beforehand in the polymerization vessel).

After the end of the monomer and initiator feed, polymerization is usually continued for a further one to two hours while maintaining the polymerization temperature. An odor effect of the novel aqueous polymer dispersions which occurs as a result of the presence of mercapto compounds having a molecular weight-regulating action can be counteracted in a conventional manner by adding effective amounts of peroxides, in particular hydrogen peroxide, or alkali metal peroxydisulfate after the end of the aqueous free radical emulsion polymerization (the conversion in the polymerization is advantageously above 99% by weight). The addition at elevated temperatures proves particularly advantageous in this respect.

The solids content of the novel aqueous polymer dispersion is usually from 10 to 50, preferably from 20 to 40%, by weight. It has proven advantageous if the number average diameter of the dispersed polymer particles is from 60 to 120 nm. This can be realized in a manner known per se by a suitable choice of the amount of dispersant used for the polymerization.

The novel aqueous polymer dispersions are particularly suitable as additives for cement-containing mineral building materials having binding properties, since they impart advantageous flow behavior to said building materials after mixing with water. The mineral binder on which said building materials are based preferably comprises at least 50%, based on its weight, of cement. Particularly advantageously, the novel action occurs when mineral binders comprising from 70 to 100% by weight of cement and from 0 to 30% by weight of gypsum are used. The use, according to the invention, in said building materials which are based exclusively on cement as the mineral binder proves to be very particularly advantageous. The novel action is substantially independent of the type of cement. Depending on requirements, it is possible to use, for example, blast furnace cement, bituminous cement, Portland cement, hydrophobic Portland cement, fast-setting cement, expanding cement or high-alumina cement, the use of Portland cement proving particularly advantageous.

The usual commercial form of mineral building materials having binding properties is their dry mixture, which traditionally comprises the mineral binder and the additives.

In this context, it is advantageous that the novel aqueous polymer dispersions can be dried in a particularly simple manner to give polymer powders which are redispersible, especially in an aqueous alkaline medium, and can thus be dry-blended with the commercial form described above, for modification. Such dry preparations are immediately ready for use after mixing with water (of course, the form used is also obtainable by adding the novel polymers directly as aqueous dispersions).

For example, the following methods can be used for the preparation of such polymer powders: spray-drying of the aqueous polymer dispersion, freeze-drying of the aqueous polymer dispersion, precipitation of the emulsion polymers from alkaline solution by the addition of an alkanol, preparation of the novel polymers by the free radical suspension polymerization method and subsequent milling.

The spray-drying method proves particularly advantageous, it being possible for conventional anti-caking agents and spray assistants to be present. However, it is particularly advantageous that the novel aqueous polymer dispersions are obtainable, as polymers redispersible in an alkaline medium, by the method of EP-A 262 326 or EP-A 332 067, even in the absence of spray assistants. Of course, the novel polymers may also contain polymerized monomers having acidic functions (for example the monomers b) in neutralized form (for example with alkali metal hydroxide or ammonia or amines). The neutralization may be effected, for example, immediately before spray-drying. The acidic monomers b and c can, however, also be used in neutralized form for the polymerization. However, polymers which contain up to 10 mol % of the acidic monomers b and c in neutralized form are preferred.

It is noteworthy that, as a rule, the novel aqueous emulsion polymers display their action according to the invention when used in amounts of from 0.25 to 10% by weight, based on the weight of the mineral binder.

As stated above, the novel products are particularly suitable for the production of self-leveling leveling compounds based on mineral binders. Their dry composition is as a rule as follows:

from 20 to 50, preferably from 20 to 40%, by weight of mineral binder (preferably exclusively cement), from 0.2 to 3, preferably from 0.5 to 1.5%, by weight of novel polymer and from 0 to 25% by weight, based on the mineral binder, of conventional assistants (for example antifoams or surface-smoothing agents, such as $CaCO_3$), the remaining amount being sand.

The particle size of the sand is usually from 0.05 to 3 mm, depending on the intended thickness of application of the leveling compound.

In the case of these leveling compounds, mixing with water is effected, as a rule, with a weight ratio of water to mineral binder of from 0.3 to 0.8, preferably 0.4 to 0.6.

Of course, the novel polymers display their advantageous action also in those mineral building materials having binding properties which have additionally been modified with other polymers.

EXAMPLES

1. Preparation of aqueous polymer dispersions Da to De Da:
   A mixture consisting of 220 g of water, 0.5 g of a 28% strength by weight aqueous solution of the sodium salt of a mixture of sulfuric half-esters of ethoxylated $C_{12}/C_{14}$-fatty alcohols having a degree of ethoxylation of 2.8 (=emulsifier solution i), 0.3 g of Mohr's salt and 20 g of feed I was heated to 85° C. and, while maintaining the 85° C. and beginning at the same time, the remaining amount of feed I and, simultaneously therewith, feed II were added continuously in the course of 2 hours. The reaction mixture was then stirred for a further hour at 85° C.

| Feed I: | 3 g of sodium peroxydisulfate in 100 g of water; |
|---|---|
| Feed II: | 240 g of methyl methacrylate, 60 g of methacrylic acid, 7.5 g of ethylhexyl thioglycolate, 15.6 g of emulsifier solution i and 391 g of water. |

The K value of the resulting emulsion polymer was 26.3.

Db: As for Da, except that 0.24 g of tert-dodecyl mercaptan was used instead of the 7.5 g of ethylhexyl thioglycolate. The K value of the resulting emulsion polymer was 61.5.

Dc: As for Da, except that 60 g of acrylic acid were used instead of the 60 g of methacrylic acid. The K value of the resulting emulsion polymer was 23.

Dd: As for Da, except that the monomer composition was 95% by weight of methyl methacrylate and 5% by weight of methacrylic acid. The K value of the resulting emulsion polymer was 21.

De: As for Da, except that the monomer composition was 70% by weight of methyl methacrylate and 30% by weight of methacrylic acid. The K value of the resulting emulsion polymer was 26.5.

2. Preparation of self-leveling leveling compounds

A mixture consisting of 40 g of quartz sand F 35 (mean particle size 0.2 mm), 35 g of Portland cement PZ 35 F, 5 g of one of the dispersions Da to De and 15 g of water was stirred to give a self-leveling leveling compound. Immediately after mixing, the extent of spread of the materials was determined according to DIN 1060 of 1982, as a measure of their flow behavior. The results are shown in the Table below. For comparison, the Table shows the extent of spread of a corresponding preparation which contains no added polymer (DO).

TABLE

| Dispersion used | Extent of spread |
|---|---|
| DO | 120 mm |
| Da | 230 mm |
| Db | 126 mm |
| Dc | 110 mm |
| Dd | 140 mm |
| De | 160 mm |

The novel preparation (use of Da) exhibited increased flow in conjunction with the homogeneous structure of the compacted material.

We claim:

1. A mineral building material comprising:

a cement-containing mineral binder, and a polymer dispersion in aqueous or dried form, wherein said polymer dispersion is obtained by polymerizing a monomer mixture comprising (a) from 70 to 85% by weight of at least one monomer selected from the group consisting of styrene, vinyltoluenes, nitriles of α,β-monoethylenically unsaturated carboxylic acids of 3 to 6 carbon atoms and esters of α,β-monoethylenically unsaturated carboxylic acids of 3 to 6 carbon atoms and alkanols of 1 to 12 carbon atoms (b) from 15 to 25% by weight of at least one α,β-monoethylenically unsaturated carboxylic acid of 3 to 6 carbon atoms of amides thereof and (c) from 0 to 5% by weight of other copolymerizable monomers by aqueous free radical emulsion polymerization with the proviso that component (b) comprises at least 50% by weight, based on the total amount of component (b), of methacrylic acid;

and that components (a), (b) and (c) chosen so that a glass transition temperature of the resulting polymer is from 80° to 160° C. according to the Fox relationship for an emulsion polymer composed of these components;

and that the K value of the resulting emulsion polymer, determined in its fully acidic form in dimethylformamide at 23° C. and an emulsion polymer content of 0.1% by weight, being from 15 to 40, and wherein said aqueous polymer dispersion is optionally dried.

2. A mineral binding material comprising a cement-containing mineral binder and a polymer powder, and wherein said polymer powder is obtained by polymerizing a monomer mixture comprising (a) from 70 to 85% by weight of at least one monomer selected from the group consisting of styrene, vinyltoluenes, nitriles of α,β-monoethylenically unsaturated carboxylic acids of 3 to 6 carbon atoms and esters of α,β-monoethylenically unsaturated carboxylic acids of 3 to 6 carbon atoms and alkanols of 1 to 12 carbon atoms, (b) from 15 to 25% by weight of at least one α,β-monoethylenically unsaturated carboxylic acid of 3 to 6 carbon atoms of amides thereof and (c) from 0 to 5% by weight of other copolymerizable monomers, with the proviso that the component (b) comprises at least 50% by weight, based on the total amount of component (b), of methacrylic acid;

and that components (a), (b) and (c) chosen so that a glass transition temperature of the resulting polymer is from 80° to 160° C. according to the Fox relationship for a polymer composed of these components;

and that the K value of the polymer, determined in its fully acidic form in dimethylformamide at 23° C. and a polymer content of 0.1% by weight, being from 15 to 40.

3. A mineral building material as claimed in claim 1, wherein said emulsion polymer of said polymer dispersion contains monomers (b) or (c) having acidic functions in neutralized form.

4. A mineral building material as claimed in claim 2, wherein said polymer of said polymer powder contains monomers b or c having an acidic function in a neutralized form.

5. A mineral building material as claimed in claim 1, wherein component (a) consists essentially of styrene and methyl methacrylate, component (b) consists essentially of methacrylic acid and acrylic acid, and component (c) is 0.

6. A mineral building material as claimed in claim 1, wherein component (a) consists essentially of methyl methacrylate in an amount from 75 to 85 weight % based on the total of component (a) and (b), component (b) consists essentially of methacrylic acid in an mount from 15 to 25 weight % based on the total of components (a) and (b), and component (c) is 0.

7. A mineral building material as claimed in claim 1, wherein said K value is regulated with a sulfur-hydrogen compound in an amount of from 0.1 to 4% by weight based on the total monomer weight.

8. A mineral building material as claimed in claim 1, wherein said K value is regulated with ethylhexyl thioglycolate being present in an amount of from 1 to 2.5% by weight based on the total monomer weight.

9. A mineral building material as claimed in claim 1, wherein said polymer dispersion contains up to 10 mol % of said acidic monomer (b) or (c) in neutralized form.

10. A mineral building material as claimed in claim 1, further comprising from 20 to 50% by weight of said mineral binder based on dry mineral building material, from 0.2 to 3% by weight of said polymer dispersion based on dry mineral building material, and from 0 to 25% by weight based on mineral binder, of a conventional assistant, wherein said conventional assistant is an antifoam or a surface-smoothing agent.

11. A mineral building material as claimed in claim 2, wherein component (a) consists essentially of styrene and methyl methacrylate, component (b) consists essentially of methacrylic acid and acrylic acid, and component (c) is 0.

12. A mineral building material as claimed in claim 2, wherein component (a) consists essentially of methyl methacrylate in an amount from 75 to 85 weight % based on the total of component (a) and (b), component (b) consists essentially of methacrylic acid in an amount from 15 to 25 weight % based on the total of components (a) and (b), and component (c) is 0.

13. A mineral building material as claimed in claim 2, wherein said K value is regulated with a sulfur-hydrogen compound in an amount of from 0.1 to 4% by weight based on the total monomer weight.

14. A mineral building material as claimed in claim 2, wherein said K value is regulated with ethylhexyl thioglycolate being present in an amount of from 1 to 2.5% by weight based on the total monomer weight.

15. A mineral building material as claimed in claim 2, wherein said polymer powder contains up to 10 mol % of said acidic monomer (b) or (c) in neutralized form.

16. A mineral building material as claimed in claim 2, further comprising from 20 to 50% by weight of said mineral binder based on dry mineral building material, from 0.2 to 3% by weight of said polymer powder based on dry mineral building material, and from 0 to 25% by weight based on mineral binder, of a conventional assistant, wherein said conventional assistant is an antifoam or a surface-smoothing agent.

* * * * *